United States Patent [19]
Bland et al.

[11] Patent Number: 4,649,373
[45] Date of Patent: Mar. 10, 1987

[54] POWERED CONSERVATION SYSTEM IN BATTERY POWERED KEYBOARD DEVICE INCLUDING A MICROPROCESSOR

[75] Inventors: Patrick M. Bland, Delray Beach; William H. Bolt, Deerfield Beach, both of Fla.

[73] Assignee: International Business Machines Corporation, Armonk, N.Y.

[21] Appl. No.: 522,061

[22] Filed: Aug. 10, 1983

[51] Int. Cl.[4] .......................... G09G 3/00; G06F 1/00

[52] U.S. Cl. ................................ 340/365 R; 340/711; 364/707

[58] Field of Search ................... 340/365 R, 811, 711; 364/707, 705

[56] References Cited

U.S. PATENT DOCUMENTS 4,157,588 6/1979 Ebihara et al. ..................... 364/707
4,285,043 8/1981 Hashimoto et al. ................ 364/707
4,409,665 10/1983 Tubbs ................................. 364/707
4,455,623 6/1984 Wesemeyer et al. ............... 364/707

FOREIGN PATENT DOCUMENTS 8501 3/1980 European Pat. Off. .

OTHER PUBLICATIONS

Torelli et al, "PCM Remote Control Chips Detect Transmission Errors" Electronic Engineering, vol. 55, No. 676, Apr., 1983, P41–43, 47.

Patents Abstracts of Japan, vol. 6, No. 171, Sep. 4, 1982 P 140 (1049).

G. d'Andrea et al, "Frequency Synthesis for Color TV-Receivers" IEEE Transactions on Consumer Electronics, vol. CE-27, No. 3, Aug., 1981 P272–282.

Patent Abstracts of Japan No. 245, Oct. 29, 1983 (P-233) (1390).

T. G. Arthur et al, "Cordless Keyboard" IBM Technical Disclosure Bulletin, vol. 26, No. 2, Jul., 1983, P 620.

*Primary Examiner*—James L. Rowland
*Assistant Examiner*—T. Rittmaster

[57] ABSTRACT

In a self-contained battery powered keyboard entry device, the keyboard is driven from a microprocessor and its output sensed by the microprocessor to generate drive signals for an infra-red transmitter. The sense lines are monitored so that, on a key depression, the microprocessor is switched to an operating mode from its low-power standby mode. When all sensed signals have been processed and outputted, the microprocessor is returned to the low-power standby mode.

4 Claims, 2 Drawing Figures

POWERED CONSERVATION SYSTEM IN BATTERY POWERED KEYBOARD DEVICE INCLUDING A MICROPROCESSOR

TECHNICAL FIELD

The present invention relates to a power conservation system in a self contained battery powered keyboard device including a microprocessor.

BACKGROUND ART

Currently known battery powered key entry devices may be classified into two general groups.

The first group comprises calculators, extending from the simplest four function type through to the considerably more powerful programmable calculators as exemplified by the 600 and 700 series of calculators produced by Casio Corporation. All of these devices are not normally used continuously for any great length of time. The usual operational method is to switch the device on, perform one or more calculations, and then switch off. With such operations, and depending on the form of display employed, the batteries in calculators last from several months to years. In order to conserve the batteries in the event that a calculator is left on after operation, many such devices employ an arrangement in which, some minutes after a key operation, the microprocessor is switched to a standby-mode, and the display is switched off. Thereafter, the microprocessor and display are powered up by depression of a particular key, normally the CLEAR key.

The second group comprises remote control devices, for example television remote control units. In operation, these consume much more power than the average calculator as they employ some form of transmission device, such as an infra-red generator. Such control devices are normally used relatively infrequently and for short periods. Typically, a television remote control unit may generate a sequence of up to about ten control pulses during each of up to ten to twenty times a day. Between operations, these units are switched off completely. Consequently, battery drain offers no significant problem.

If, however, it is required to provide a remote self-contained, battery powered keyboard entry device for, for example, a microcomputer, battery life becomes a significant problem. Such a device may be in substantially continuous use throughout each day of a working week. With such operational conditions, without some form of battery conservation system, battery life may prove insufficient to ensure reliable operation without frequent battery changes.

It is, therefore, an object of the present invention to provide a power conservation system in such a keyboard entry device.

DISCLOSURE OF THE INVENTION

The present invention relates to a battery powered keyboard entry device in which a microprocessor processes key entry signals to produce coded output signals to drive an infra-red light emitting device. When the microprocessor has processed the received key entry signals, it is set into its low power standby mode and is not powered up until the next keystroke is detected. Accordingly, battery power is conserved as the microprocessor is for the majority of the time in its low power standby mode.

BEST MODE FOR CARRYING OUT THE INVENTION

Figure 1:
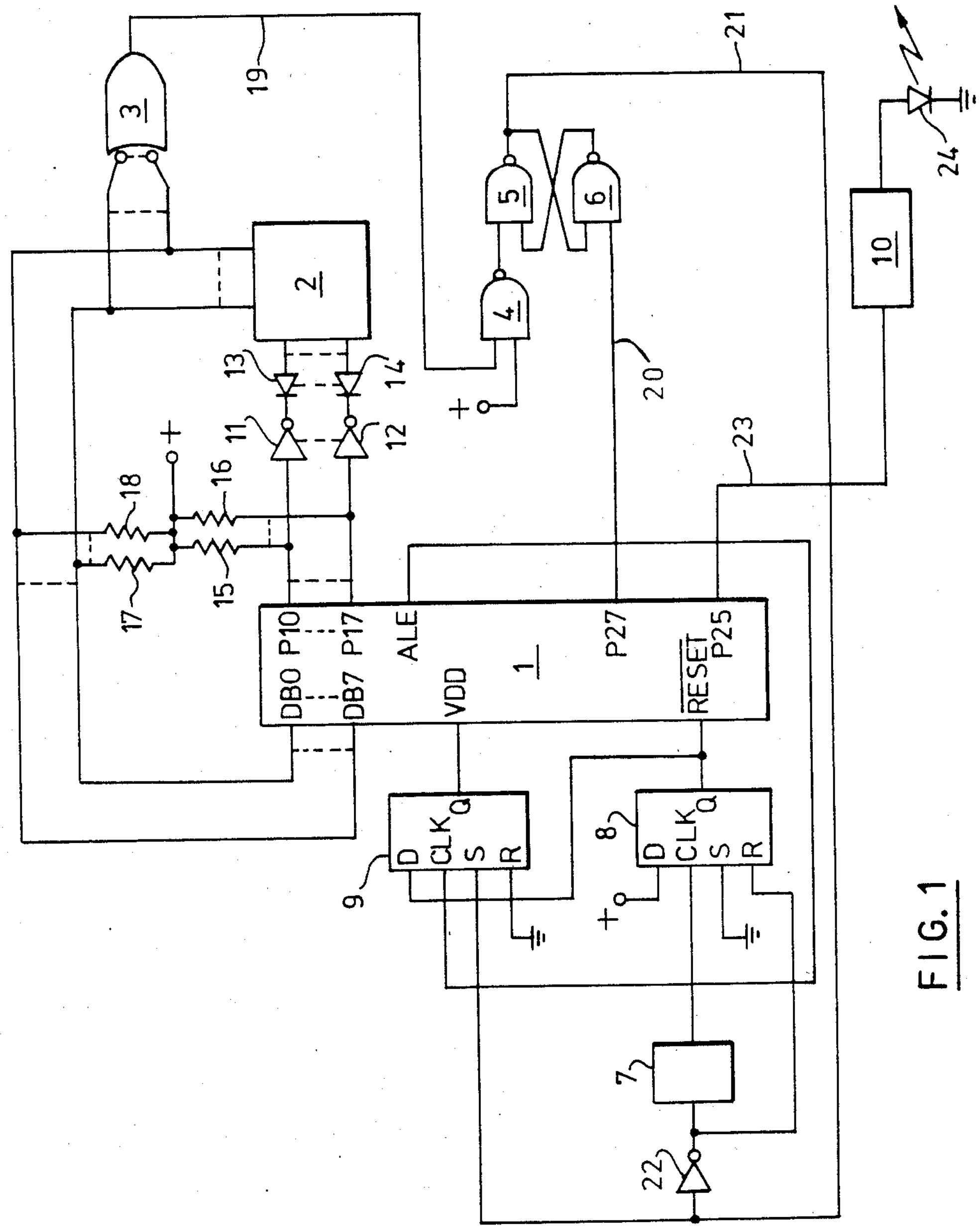
FIG. 1 shows the circuit of a battery powered keyboard entry device.

In FIG. 1, a keyboard entry device includes a microprocessor 1 coupled to a matrix keyboard 2. Microprocessor 1 may be the 80C48 microprocessor produced by Nippon Electric Company. For simplicity, only the inputs and outputs particularly relevant to the present invention have been shown. These are, the input data port lines, comprising 8 inputs DB0 through DB7, the first output port lines, again 8 lines, P10 through P17, the address latch enable output ALE, which provides an output once during each processor cycle and is, therefore useful as a clock output, two lines P25 and P27 of the second output port, a NOT RESET input, and the low power standby input $V_{DD}$.

The first output port lines P10 through P17 are coupled through eight inverting amplifiers 11–12 and eight diodes 13–14 to drive the matrix keyboard 2. Eight sense lines from the keyboard 2 are fed back to the data input port DB0 through DB7 of microprocessor 1. Each matrix drive line is coupled through an associated one of eight resistors 15–16 to battery positive, and each matrix sense line is similarly coupled to the battery positive through an associated one of eight resistors 17–18.

Keyboard 2 is of the matrix contact type, in which depression of a key connects the single drive and sense lines which cross at the key position. Suitable keyboard technologies for the present system include the full travel contact membrane system or a carbon contact-/rubber dome system.

Figure 2:
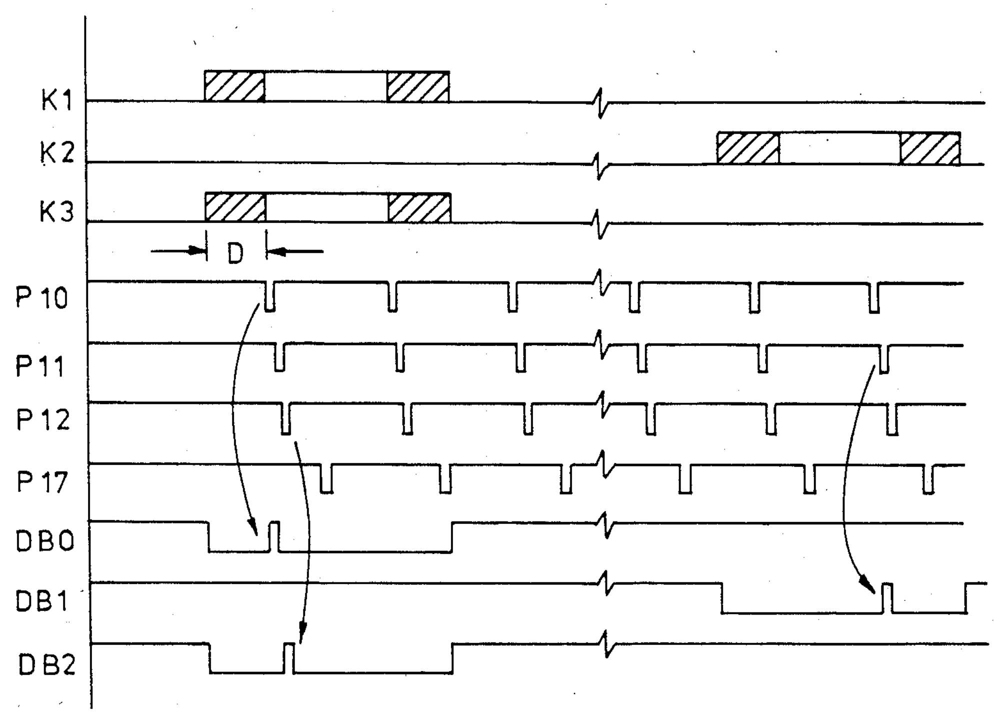
FIG. 2 is a timing diagram of keyboard drive and sense signals.

FIG. 2 shows the signals on the keyboard drive and sense lines in a typical operation of the FIG. 1 system. As an example, let us look at the signals on the drive line from P10 and the resulting sense signals applied to DB0. With none of the eight keys coupled to the sense line depressed, this sense line is held high through resistor 17, as substantially no current flows through the resistor into the sense line. Similarly when none of the keys coupled to the P10 drive line is depressed, the input to inverting amplifier 11 is high, its output is, therefore, low, but no current flows through diode 13 as the drive line is not connected within matrix 2. When the key coupling these lines is depressed, current flows through resistor 17, the associated keyboard contacts, and then through diode 13, as the output of amplifiers 11 is still low. Thus, the voltage level on the DB0 sense line is lowered. Subsequently, when microprocessor 1 emits a drive pulse on P10, resistor 15 conducts, lowering the input to amplifier 11. The output of this amplifier is thereby raised, cutting off current through diode 13, so, for the period of the P10 pulse, the DB0 line goes high. In a scan cycle the P10 pulse is followed in turn by the P11 through P17 pulses to drive each of the drive lines, and outputs are provided on each sense line corresponding to a depressed key. FIG. 2 shows the timing of the arrangement. Lines K1 and K3 show the depression time of two keys corresponding respectively to drive P10/sense DB0 and drive P12/sense DB2. Line K2 shows the depression time of a single key, which is depressed subsequent to the above mentioned pair, and corresponds to drive P11/sense DB1. To give some idea of the actual times involved, each key depression time shown may occupy 60 m secs, of which the useful time is the central 30 m secs, the hatched areas indicating times of possible contact bounce or noise. As shown, the drive pulses at P10 through P17 take a total period of 16 m secs. The arrows indicate that for the K1 and K3 key depressions appropriate sense signals appears on the DB0 and DB2 sense lines and for the K2 key depression, on the DB1 sense line.

In FIG. 2, it is assumed that prior to any of the key depressions shown, microprocessor 1 is in its low power standby condition, and therefore no signals are generated on the P10 through P17 lines. Upon depression of a key, the P10 through P17 signals are initiated after a delay D. This is shown in FIG. 2 as a delay of 15 m secs, but it may be of any length sufficient to allow the first cycle of the drive signals (15 m secs. in FIG. 2) to take placed within the 30 m secs. sense time for the first key depression. This delay is to permit the microprocessor to power up from its low power standby condition.

Referring back to the details of FIG. 1, an 8 input NOR gate 3 has each of its inputs coupled to an associated one of the DB0 through DB7 sense lines. With no key depressed, all of these lines are high, so the output on line 19 is low. Line 19 is coupled as a set input to a latch circuit comprising three NAND gates 4, 5 and 6, which is reset by a signal on line 20 which will be described later. Assuming, for the present, that the latch circuit has been reset, the signal on line 19 sets it to raise output line 21 from a '0' condition to a '1' condition.

This '1' condition on line 21 is applied directly to the S input of a D flip-flop 9, and after inversion by inverter 22, as a '0' input to a single shot 7 and the R input of a D flip-flop 8. Immediately prior to this time, flip flop 9 had no input to its clock line, the S input was '0', the D input was '0' and the R input was '0', so the Q output was '0'. This Q output is applied, as shown, to the $V_{DD}$ input of microprocessor 1 and when in a '0' state, sets the microprocessor into its low power standby mode. Now, when the S input from line 21 changes to '1', flip-flop 9 switches to provide a '1' output at Q, thereby releasing the microprocessor from the standby mode. As mentioned above, the '0' input from inverter 22 is, at the same time, applied to a 16 m sec. single shot delay circuit 7 and to the R input of flip-flop 8. As can be seen, the D input of this flip-flop is always '1' and the S input is always '0'. Prior to arrival of the '1' signal from inverter 22, the R input is '1' so the Q output is '0' thereby placing microcomputer in a reset state. The '0' signal from inverter 22 to the R input of flip flop 8 does not alter the Q output, but sets the flip flop in its synchronous mode to respond to a signal at the clock input. This clock input arrives 16 m. secs later from delay circuit 7 as a rising edge which sets flip-flop 8 to provide a '1' output. This takes microprocessor 1 out of its reset condition. It is noted that this output is also applied to the D input of flip-flop 9, but at this time this flip-flop is operating in the asynchronous mode (S=1) so the D input signal has no effect on the Q output.

Thus, what has happened so far is that a key has been depressed, flip-flop 9 has switched microprocessor 1 from its standby to its operating mode and, after a 16 m sec. delay, flip-flop 8 has removed reset from the microprocessor. The microprocessor now responds to keystroke inputs at inputs DB0 through DB7, converts this data to a form suitable for transmission, and after buffering in an internal transmit buffer, sends the data in serial fashion to a line 23 from output P25 of the second output port. Line 23 is connected to a driver amplifier 10 which drives a light-emitting diode 24 to provide infrared pulses for transmission to a receiver device.

The microprocessor continuously monitors the content of the transmit buffer, and when it empties, generates a signal on output P27 of the second output port. This signal is applied to NAND gate 6 to switch the latch including this NAND gate and thereby return line 21 from the '1' state back to the '0' state. This is transmitted through inverting amplifier 22 to the R input of flip-flop 8 as a '1' signal. This resets this flip-flop to provide a '0' output to the NOT RESET input of the microprocessor, thereby setting it into its reset state. This '0' output is also applied to the D input of flip-flop 9, setting it into the synchronous mode. In this mode, the next rising edge of a clock pulse from the microprocessor ALE output switches the flip flop to provide a '0' output. This is applied to the $V_{DD}$ input of the microprocessor which then reverts to its low power standby mode.

Thus, what has been described above is a keyboard entry device using battery power. The battery life is extended by placing the microprocessor in a standby, low power condition immediately after it has processed and passed on the received keystroke data. In all but a very few exceptional cases, this condition is entered between each keystroke.

If we take an example of a system operating at 10000 keystrokes per eight hour day, with the electronics taking 0.1 sec. to process each keystroke and then power down to the standby condition, then the electronics are dynamic for 16.67 minutes, or 3.5% of the day and at standby for the remaining 96.5% of the day. With a 6 m A dynamic current and a 1.5 $\mu$A standby current, this gives a battery drain of $(1.5/10^6 \times 96.5/100 \times 8 + 6/10^3 \times 3.5/100 \times 8) \times 10^3 = 1.6916$ m A - hr. per day. This compares dramatically with the worst case in which the electronics remain in the dynamic state continuously. In this case the battery drain would be $(6/10^3 \times 8) \times 10^3 = 48$ m A - hr per day. With the prior art arrangements in which the standby condition is entered minutes after the last keystroke, it is quite probably that this worst case situation would be the normal situation with, possibly, standby entered only once or twice a day.

While the invention has been particularly described with reference to a preferred embodiment, it will be understood by those skilled in the art that various changes in form and detail may be made without departing from the spirit and scope of the invention.

We claim:

1. A battery powered keyboard device comprising a battery, a matrix keyboard having drive lines, sense lines orthogonal to the drive lines and keys at intersections of the drive and sense lines for coupling corresponding drive and sense lines when depressed, said sense lines being coupled to said battery for providing a high potential on said sense lines with no keys depressed and a low potential on a sense line coupled to a depressed key, a microprocessor having an output port coupled to said sense lines, an output line for carrying output signals generated by the microprocessor in response to sense line signals at said input port, and a low power standby mode input energizable to switch the microprocessor from a low power standby condition to a powered condition, an infra-red light emitting device coupled to be driven from said output line, and a power conservation system comprising a NOR circuit having a plurality of inputs each coupled to an associated one of said sense lines and responsive to a change from said high to said low potential on any of said sense lines to generate a first signal, second means responsive to said first signal for energizing said low power standby mode input of the microprocessor to power up the microprocessor for driving said drive lines through said output port, said second means being responsive to a microprocessor output signal indicating completion of processing of all sense signals received from said sense lines at the input port in response to the driving of the drive lines to de-energize the low power standby mode input and thereby return the microprocessor to said low power standby condition.

2. A keyboard device according to claim 1 in which the second means includes a first latch circuit coupled to the output of the NOR circuit and to receive said microprocessor output signal indicating completion of processing for switching respectively between its set and reset states.

3. A keyboard entry device according to claim 2 including a second latch circuit having a first input coupled to the output of the first latch circuit and its output coupled to the microprocessor low power standby mode input.

4. A keyboard entry device according to claim 3 including a delay circuit coupled between the output of said first latch circuit and an input of a third latch circuit, said third latch circuit having its output coupled to a resetting input of the microprocessor.

* * * * *